(12) United States Patent
Cuttill et al.

(10) Patent No.: US 9,863,578 B2
(45) Date of Patent: Jan. 9, 2018

(54) WARNING DEVICE

(71) Applicant: Lakeside Plastics, Inc., Oshkosh, WI (US)

(72) Inventors: Michael A. Cuttill, Oshkosh, WI (US); Anne M. Meunch, Oshkosh, WI (US)

(73) Assignee: LAKESIDE PLASTICS, INC., Oshkosh, WI (US)

( * ) Notice: Subject to any disclaimer, the term of this patent is extended or adjusted under 35 U.S.C. 154(b) by 0 days.

(21) Appl. No.: 14/276,694

(22) Filed: May 13, 2014

(65) Prior Publication Data

US 2015/0332617 A1 Nov. 19, 2015

(51) Int. Cl.
| | | |
|---|---|---|
| *E01F 15/10* | (2006.01) |
| *F16M 13/02* | (2006.01) |
| *G09F 17/00* | (2006.01) |
| *G09F 7/00* | (2006.01) |
| *E01F 13/02* | (2006.01) |
| *E01F 9/688* | (2016.01) |
| *E01F 9/654* | (2016.01) |
| *E01F 9/692* | (2016.01) |
| *E04G 21/32* | (2006.01) |
| *G09F 7/18* | (2006.01) |

(52) U.S. Cl.
CPC .......... *F16M 13/022* (2013.01); *E01F 9/654* (2016.02); *E01F 9/688* (2016.02); *E01F 9/692* (2016.02); *E01F 13/028* (2013.01); *E04G 21/3204* (2013.01); *G09F 7/00* (2013.01); *G09F 17/00* (2013.01); *G09F 2007/1856* (2013.01); *G09F 2007/1873* (2013.01); *G09F 2017/0083* (2013.01)

(58) Field of Classification Search
CPC ................................. E01F 9/012; E01F 9/018
USPC .................................................. 404/9, 6, 10
See application file for complete search history.

(56) References Cited

U.S. PATENT DOCUMENTS

| | | | | |
|---|---|---|---|---|
| 2,333,273 A | * | 11/1943 | Scanlon ................. | E01F 9/612 116/200 |
| 2,483,734 A | * | 10/1949 | Neal ....................... | E01F 9/612 116/209 |
| 4,889,067 A | * | 12/1989 | Provence, Jr. ............ | 116/63 C |
| 5,026,204 A | * | 6/1991 | Kulp ..................... | E01F 9/0124 116/63 P |
| 5,560,732 A | * | 10/1996 | Kulp ....................... | E01F 9/012 116/63 P |

(Continued)

OTHER PUBLICATIONS

Bird Ladder and Equipment Co., Inc., Roof Zone 65001 Galvanized Warning Line System, (retrieved Sep. 2013).

(Continued)

*Primary Examiner* — Thomas B Will
*Assistant Examiner* — Katherine Chu
(74) *Attorney, Agent, or Firm* — Cherskov Flaynik & Gurda, LLC

(57) ABSTRACT

The present invention provides a device for displaying hazard indicia, having a stanchion defining a first end and a second end, whereby the first end defines a first cross section that is smaller than a second cross section of the second end; a base adapted to removably receive the second end of the stanchion so as to maintain the stanchion in a vertical position; and a means for allowing the device to be collinearly stacked on top of a second device such that only the second end of the device and the second end of the second device contact.

14 Claims, 16 Drawing Sheets

(56) References Cited

U.S. PATENT DOCUMENTS

| | | | | |
|---|---|---|---|---|
| 5,755,528 | A * | 5/1998 | Kulp | E01F 9/0124 116/63 P |
| D406,543 | S | 3/1999 | Brown et al. | |
| 5,931,424 | A | 8/1999 | Kerber | |
| 5,993,105 | A * | 11/1999 | Chan | E01F 9/0175 116/173 |
| 6,053,281 | A | 4/2000 | Murray | |
| 6,182,600 | B1 | 2/2001 | Brown et al. | |
| 6,186,699 | B1 * | 2/2001 | Kulp | E01F 9/012 116/63 C |
| 6,536,369 | B1 * | 3/2003 | Bent | E01F 9/016 116/173 |
| 6,585,080 | B2 | 7/2003 | Murray | |
| 8,777,512 | B2 * | 7/2014 | Henderson | E01F 9/0122 116/63 C |
| 2005/0008433 | A1 * | 1/2005 | Dvoracek | E01F 9/0122 404/9 |
| 2005/0220537 | A1 * | 10/2005 | Bentley | B65H 75/38 404/9 |

OTHER PUBLICATIONS

Big Rock Supply, Reeves 426 Econo Warning Line System, (retrieved Sep. 2013).
Tools and Supplies for Less, Redline Warning Line System, (Apr. 17, 2012).
Western Safety Products, Inc., Guardian Temporary Warning Line System, (retrieved Sep. 2013).
Western Safety Products, Inc., Guardian Permanent Warning Line System, (retrieved Sep. 2013).
Big Rock Supply, Perimeter Warning Line System (retrieved Sep. 2013).
Big Rock Supply, Folding Warning Line System (retrieved Sep. 2013).

* cited by examiner

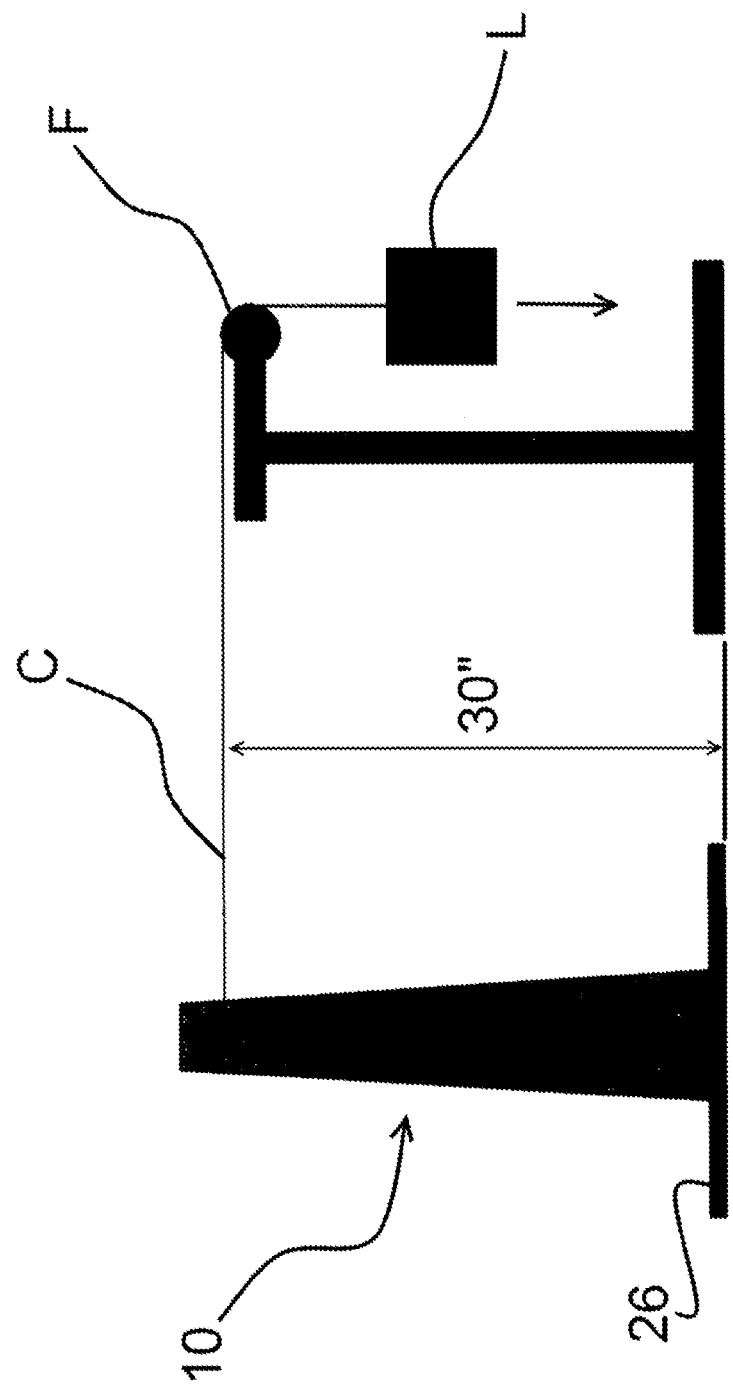

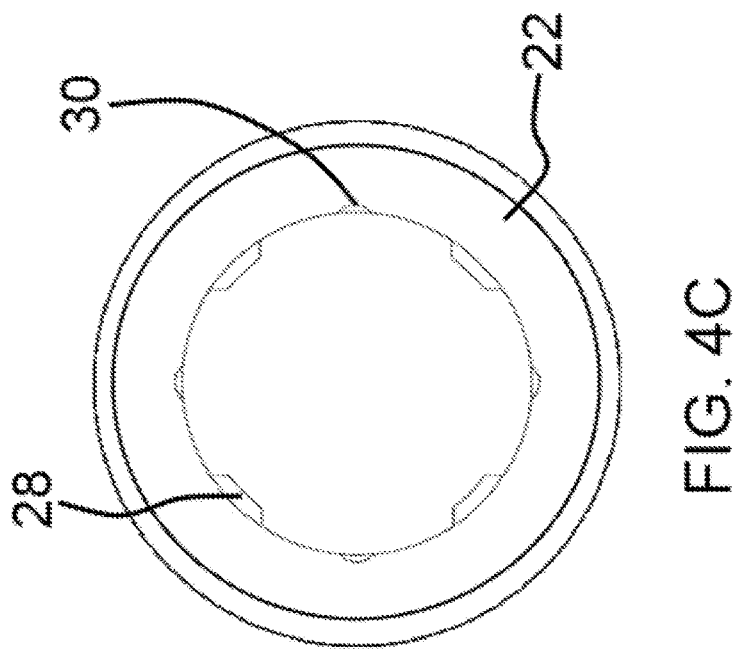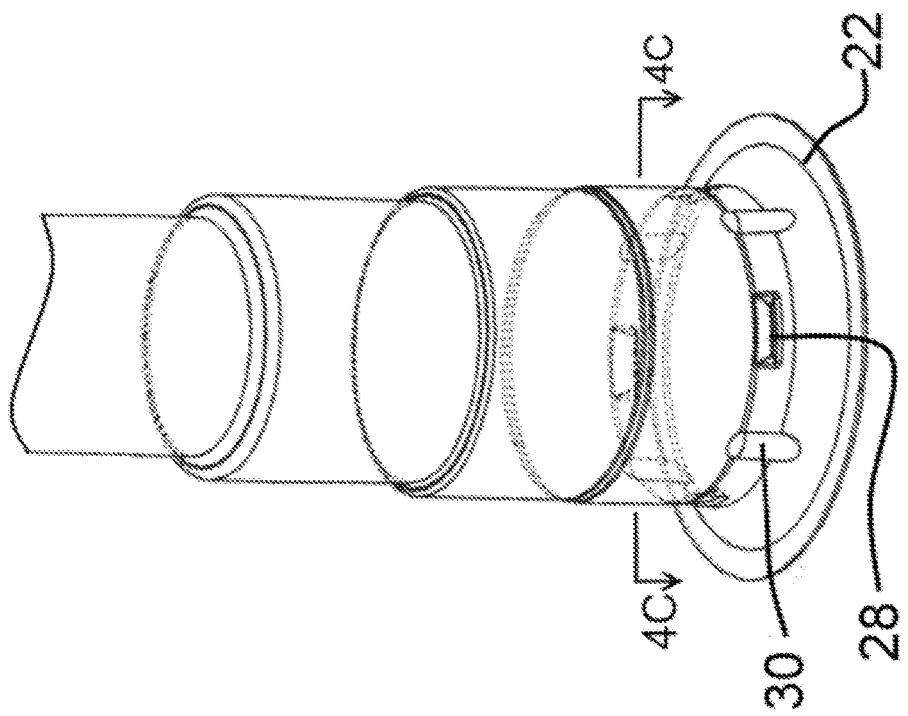

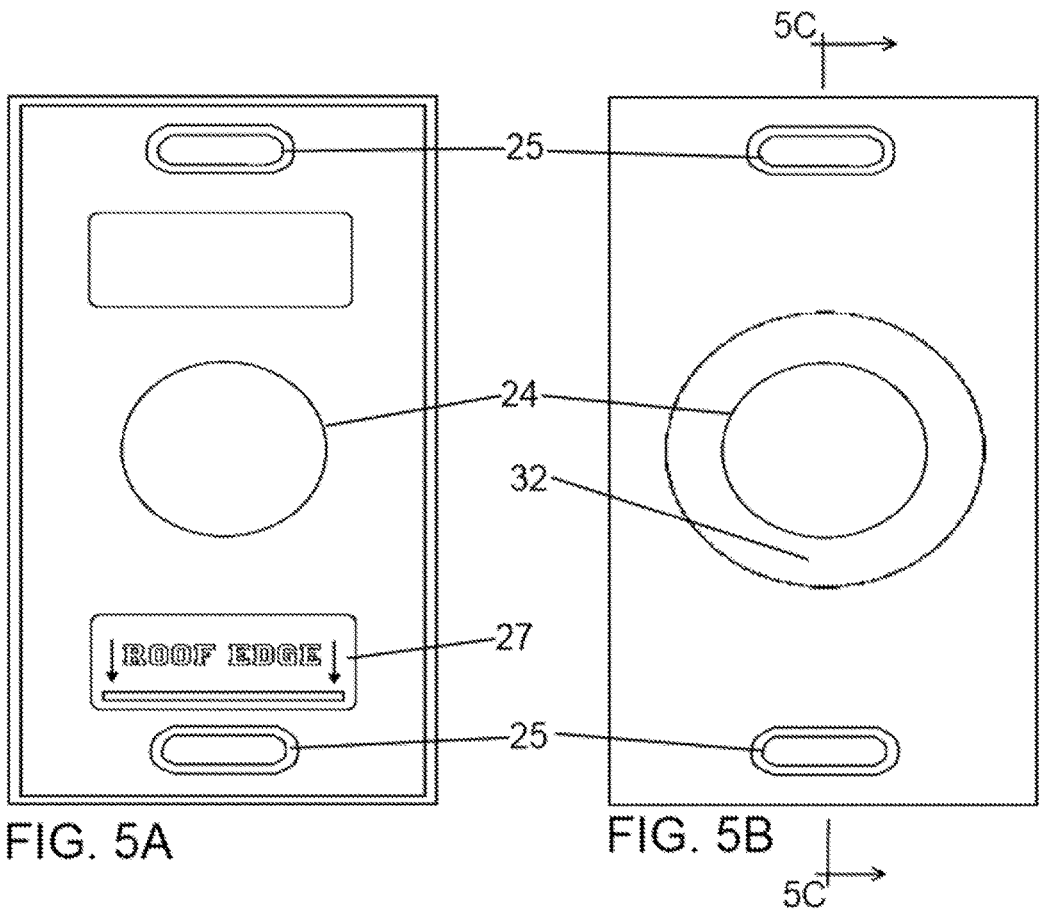
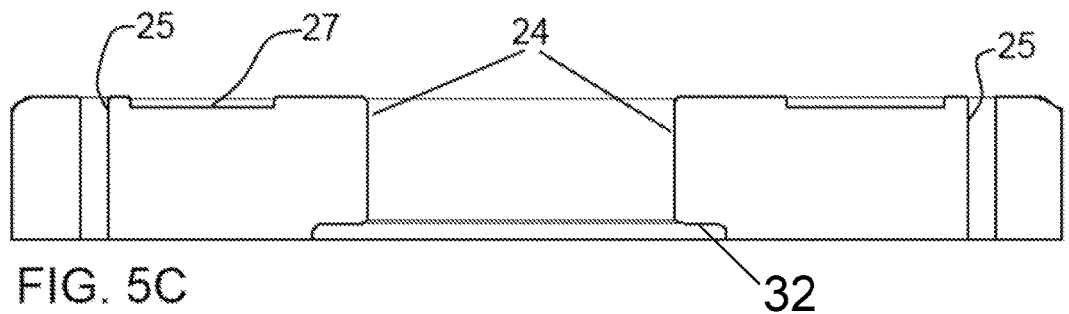

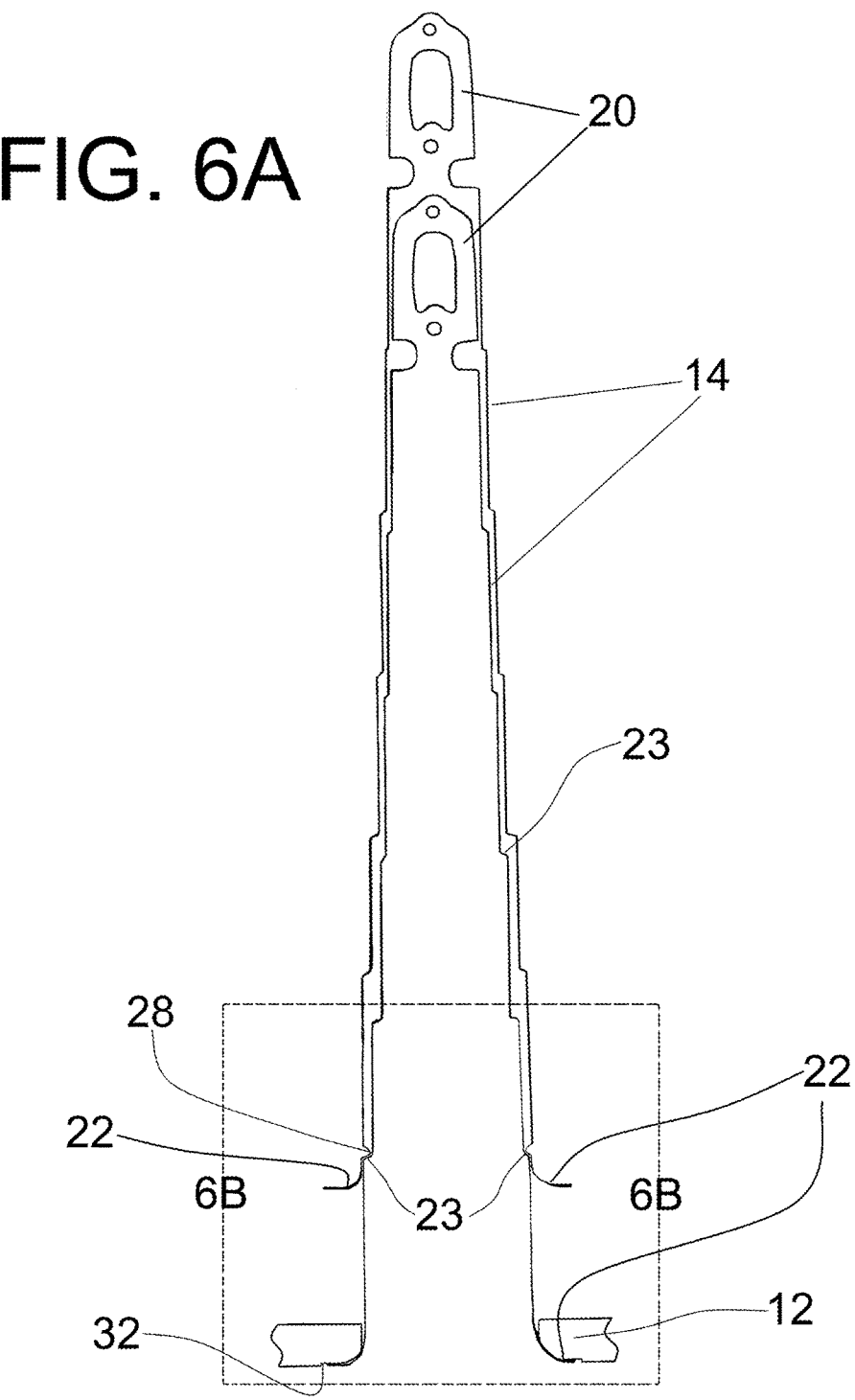

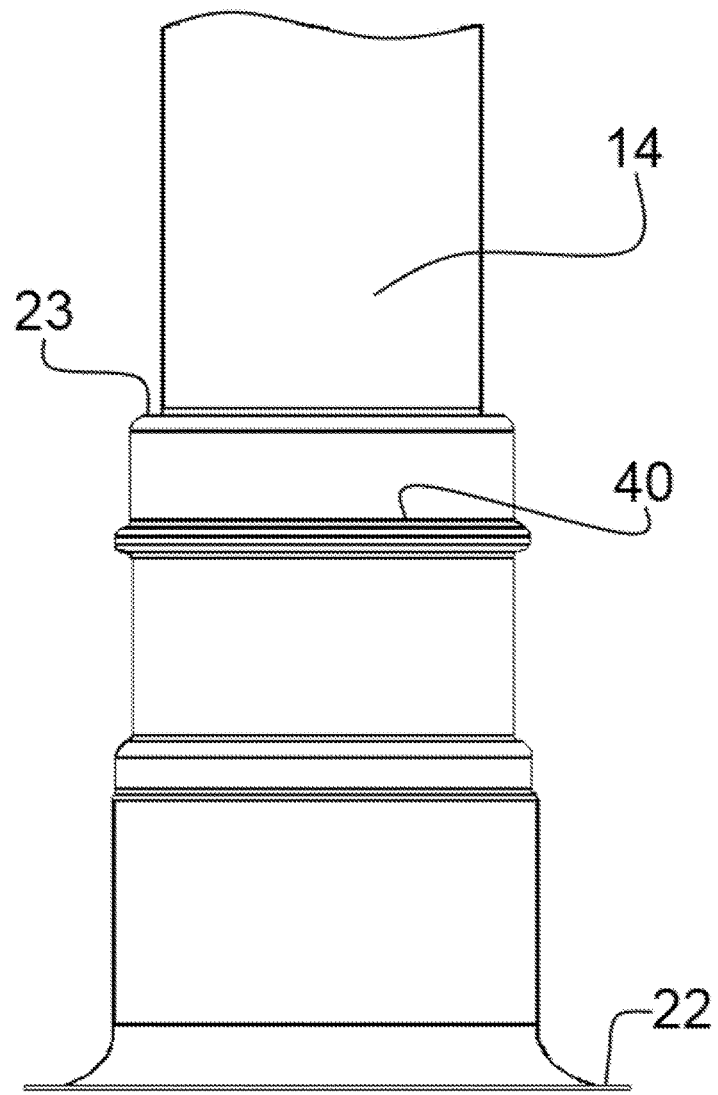

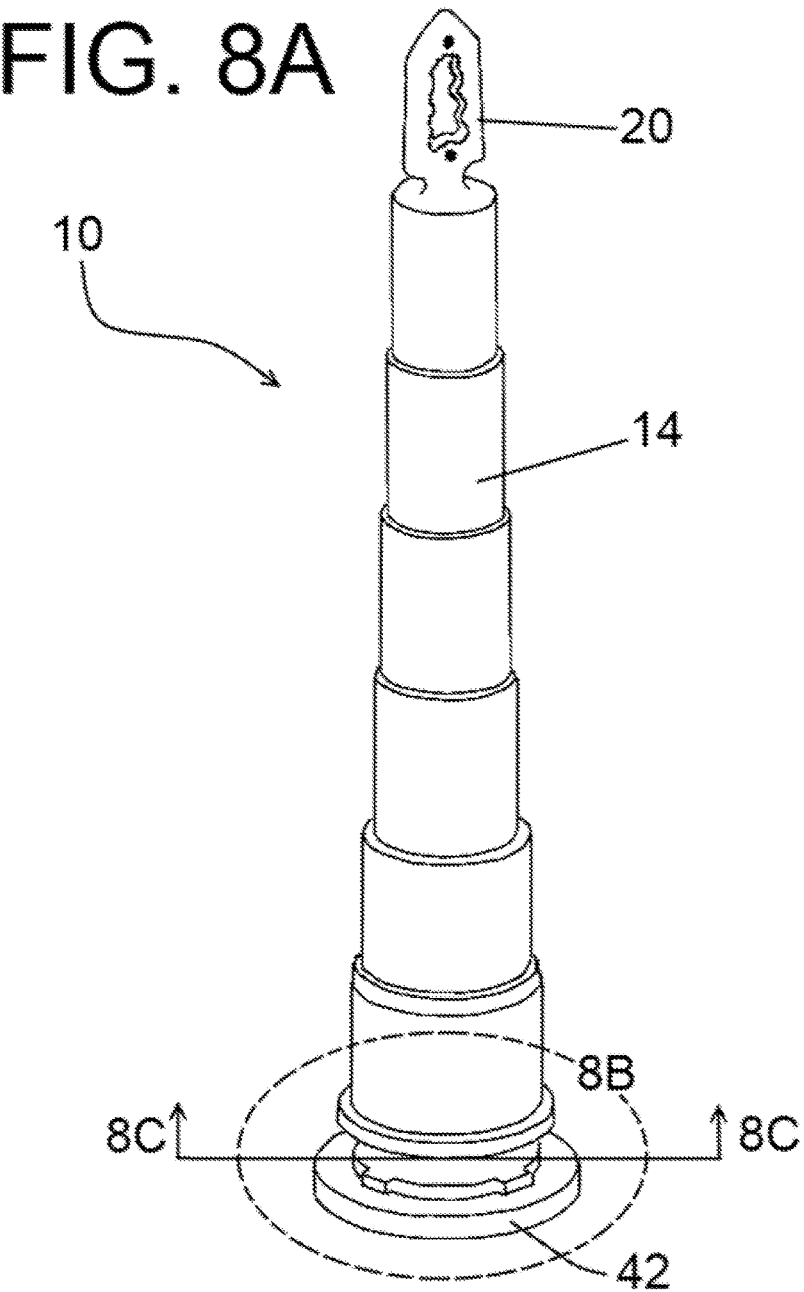

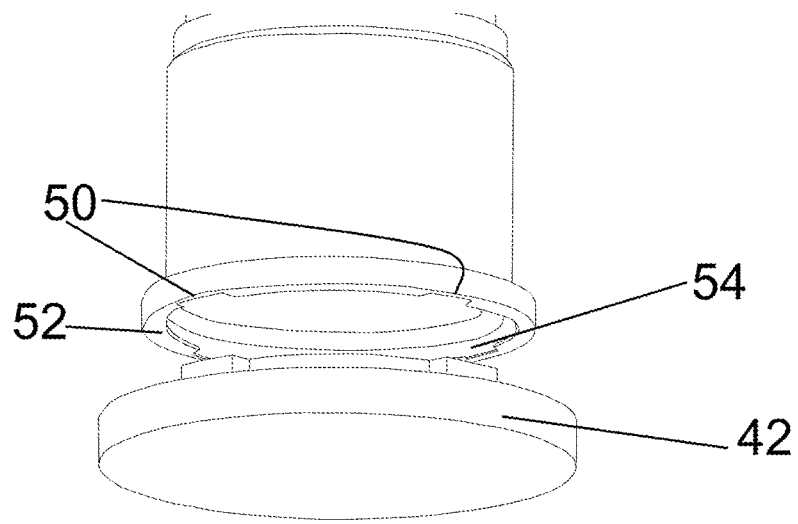
FIG. 8B
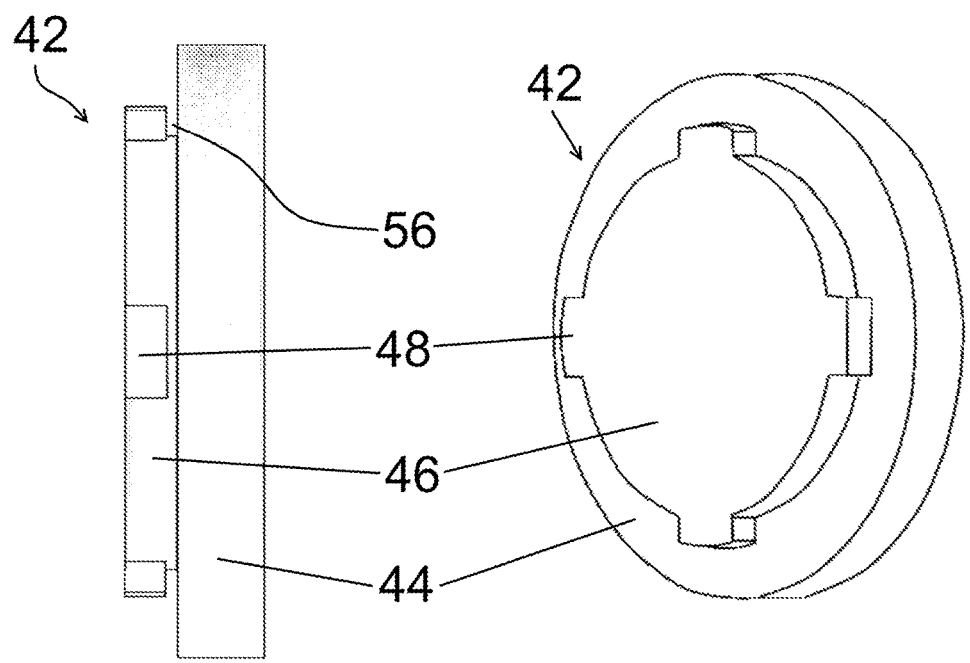
FIG. 8D
FIG. 8E

WARNING DEVICE

PRIORITY

This invention claims priority of U.S. Provisional Patent Application No. 61/822,839, filed on May 13, 2013, the entirety of which is incorporated herein by reference.

BACKGROUND OF THE INVENTION

1. Field of the Invention

This invention relates to a device for alerting persons of drop offs and more specifically, this invention relates to stackable roof stanchions that are removably placed at roof peripheries to alert workers of fall hazards.

2. Background of the Invention

Working on roofs is hazardous. Annually, approximately 100,000 professional workers fall off roofs, resulting as many as 200 deaths in the U.S. Accidents sustained by homeowners and other do-it-yourselfers increase these numbers.

Attempts have been made to placard the hazards associated with roof edges. The Occupational Safety and Health Administration (OSHA) has promulgated rules related to the height of warning barriers, those rules including OSHA Rule 1926.502(F)(2)(iii). However, placarding of such roof hazards must consider not only mandatory heights, but also assure that the warning structures withstand tipping due to wind, slippery roof surfaces, and casual contact with workers or materials.

A need exists in the art for a stanchion to support roof hazard warning indicia. The stanchion should abide by all height and tipping requirements as mandated by OSHA and other authorities. The device should be reversibly attached to surfaces predisposed in the horizontal or non-horizontal configuration. The device should further allow for compact stowage during nonuse.

SUMMARY OF INVENTION

An object of the invention is to provide warning indicia support that overcomes many of the disadvantages of the prior art.

Another object of the invention is to provide a roof edge warning device. A feature of the device is its reversibly deformable base. An advantage of the device is that a stanchion anchored by the base can be deflected or otherwise acted upon with a laterally applied force of greater than 16 pounds and still remain upright.

Yet another object of the present invention is to provide an economical and efficient means for displaying roof edge hazard indicia. A feature of the invention is that stanchions utilized to enable mandated heights for placarding are stackable on top of each other. An advantage of the invention is that a plurality of the stanchions can be stowed in the same foot print that a single stanchion can be stowed.

Briefly, the invention provides a device for displaying hazard indicia, the device comprising a stanchion defining a first end and a second end; and a base adapted to removably receive the stanchion so as to maintain the stanchion in a vertical position.

BRIEF DESCRIPTION OF DRAWING

The invention together with the above and other objects and advantages will be best understood from the following detailed description of the preferred embodiment of the invention shown in the accompanying drawings, wherein:

FIG. 3 depicts a single module of the invented device in tipping tests, in accordance with features of the present invention.

FIGS. 4A-C depict detail related to topography of the outwardly facing surfaces of stanchions, including frictional engagement means and anti-sticking means, in accordance with features of the present invention;

FIGS. 5A-C depict various views of the base of the invention, in accordance with features of the invention;

FIGS. 6A-C depict a schematic view of two stacked stanchions, showing clearance points, in accordance with features of the present invention;

FIG. 7 depicts an alternate embodiment of the present invention featuring an annular protrusion, in accordance with features of the present invention;

FIGS. 8A-E depict another alternate embodiment featuring a plug for the stanchion, in accordance with features of the present invention;

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1A:
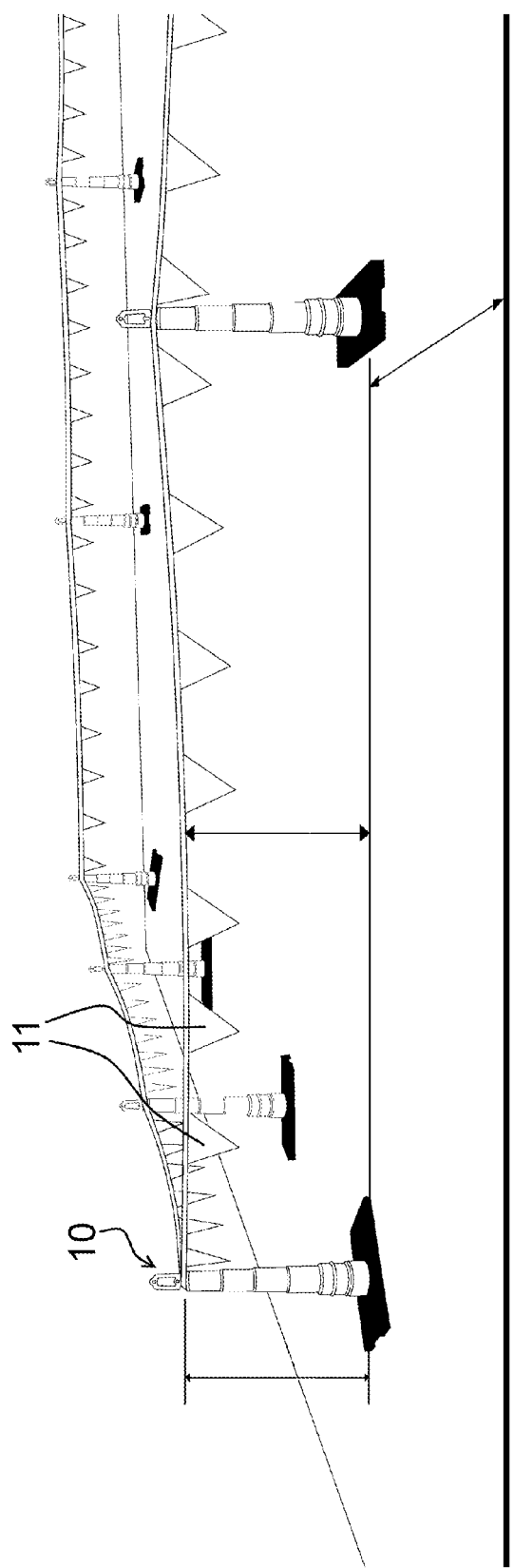
FIG. 1A depicts the present invention in operation, in accordance with features of the present invention.
Figure 1B:
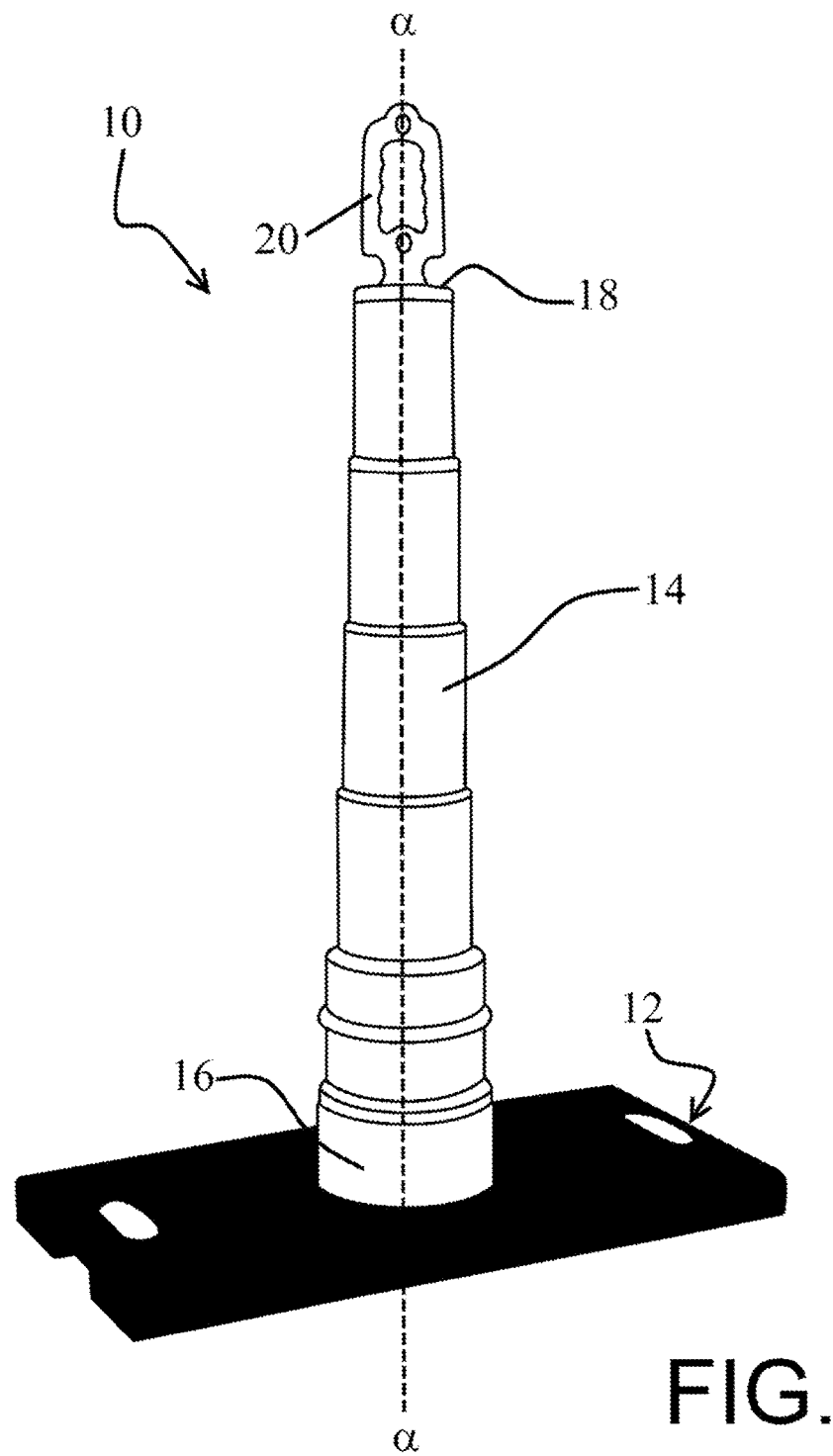
FIG. 1B depicts a single module of the present invention, in accordance with features of the present invention.

As shown in FIG. 1A, the invention provides for a plurality of modules 10 used together with warning indicia 11 such as flags, tape, rope, or other demarcations to define edge hazards. FIG. 1B depicts a single module designated as numeral 10. In its simplest form, the device 10 comprises a base 12 adapted to slidably and reversibly receive the stanchion 14.

Stanchion Detail

Figure 8C:
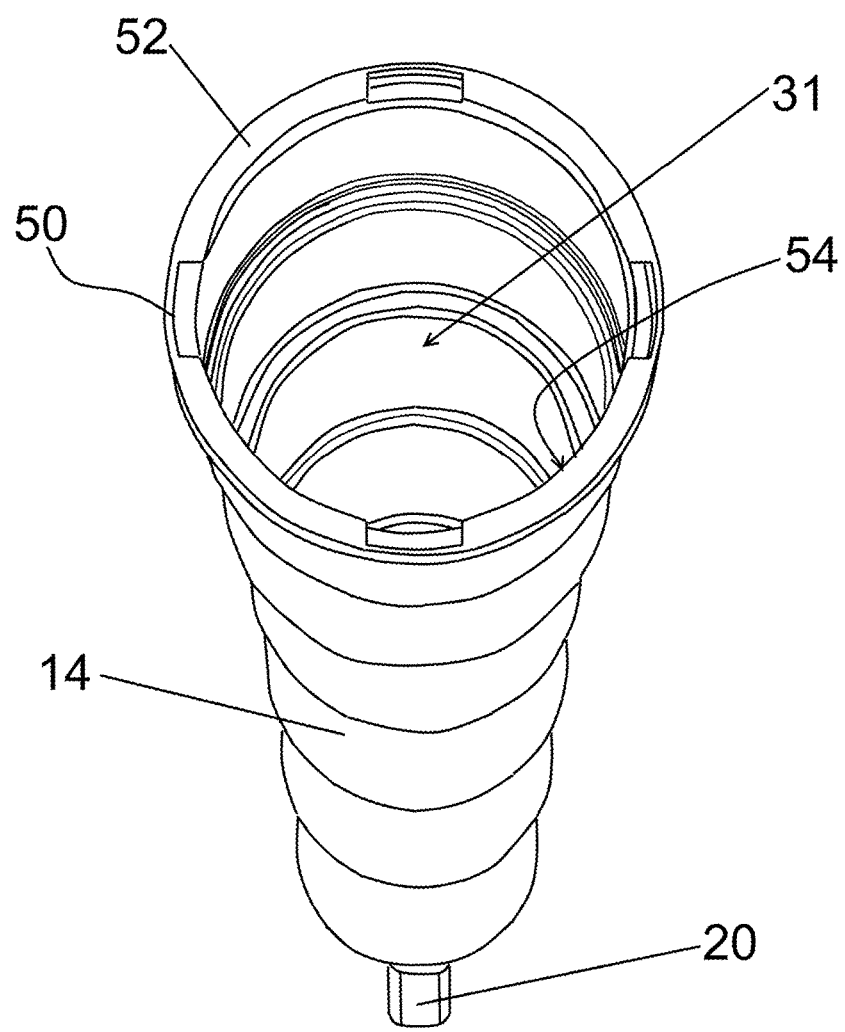

In an embodiment of the device, the cross section of the stanchion 14 decreases in size as the stanchion extends from its first end 16 (i.e. its depending end) to a second end 18. As a result, longitudinally extending exterior surfaces of the stanchion define a stepped down appearance. The importance of this feature is multi-fold and includes optimization of the rigidity of the stanchion along its longitudinal axis. Another advantage of this feature is enabling the stacking of stanchions so that the longitudinal axis of the stanchions are coaxial with each other. The stacking interaction is enabled inasmuch as the base of each stanchion defines an opening 31 to provide ingress into the interior cavity formed by the shell of each stanchion. As such the opening 31 has a cross section similar to the cross section of mating stanchions such that the opening is adapted to slidably receive the topography of another stanchion. The opening is depicted in FIG. 6C and FIG. 8C.

The stepped design also allows for ease in applying tape-style reflectors or glow in the dark reflectors for enhanced visibility in low light conditions. In an embodiment of the invention, the individual sections defining longitudinally extending steps have a consistent cross section so that the exterior surfaces do not taper toward the longitudinal axis α of the stanchion. In other embodiments, the surfaces do taper.

The second end 18 of the stanchion 14 may terminate in a loop, 20, latch or other means to enable attachment of flags, lights, or cables between stanchions. For example, a warning line can be looped around the base of the loop 20, or else passed through the handle. The size of the loop can vary to accommodate varying positions of the warning indicia (e.g. tape) relative to the base support surface. The loop also allows for easy gripping and transporting of the stanchion-base module. In an embodiment of the invention, the loop is permanently attached to the stanchion, while other embodiments the loop, light, bracket or clip is reversibly attached.

Figure 2:
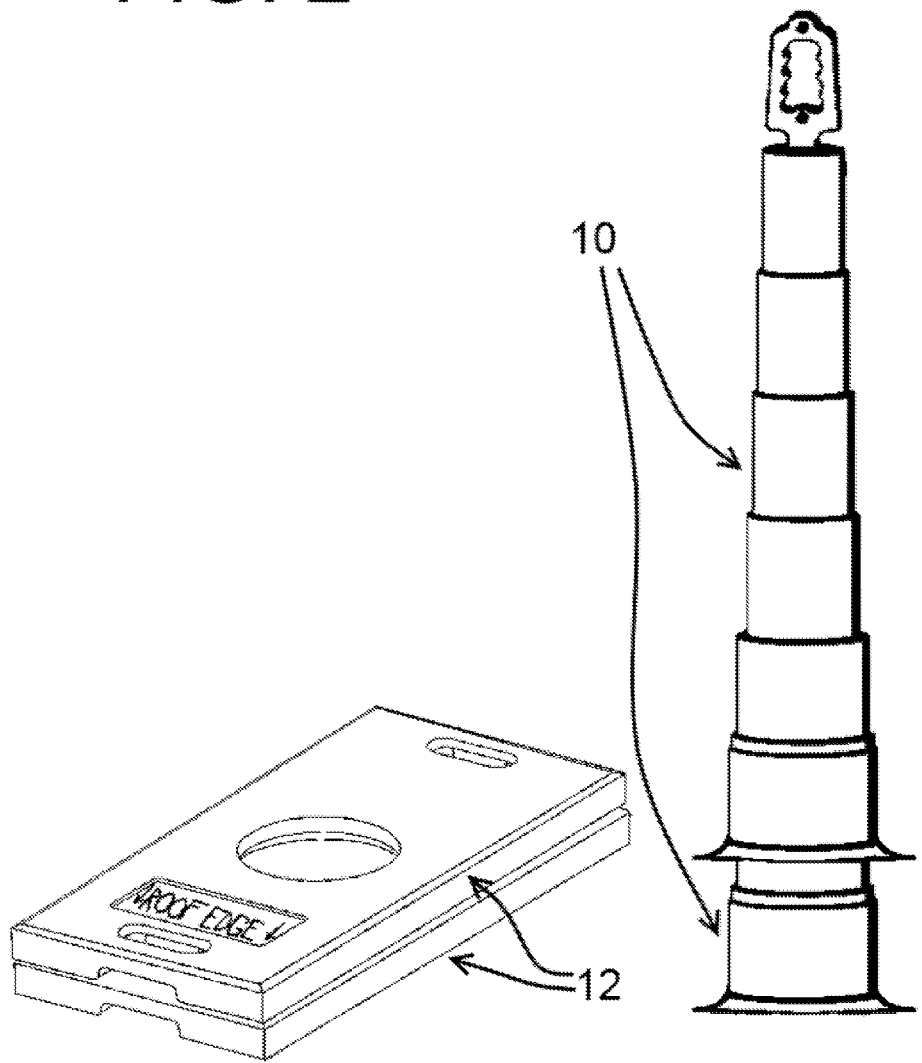
FIG. 2 depicts stacked components of two modules.
Figure 4A:
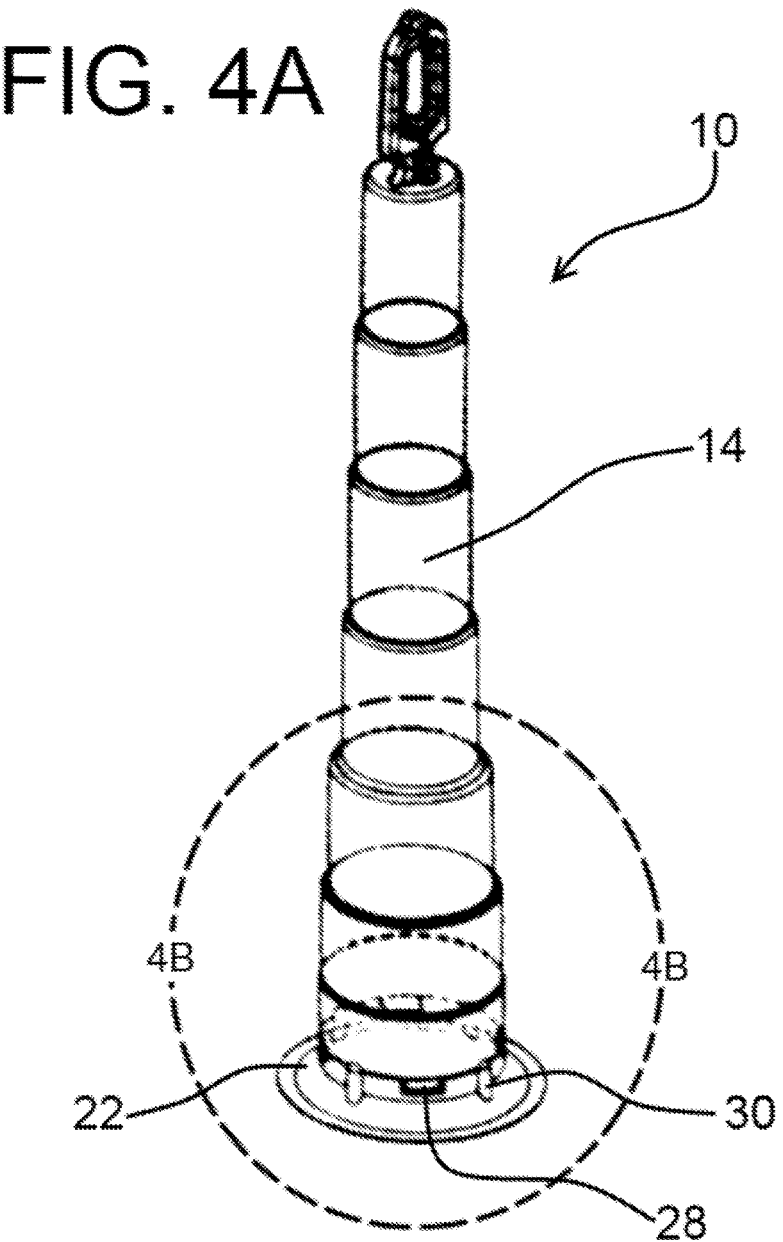

FIG. 2 depicts two stacked stanchions and two stacked bases. As is depicted in FIG. 4A, the first end 16 of the stanchion 14 terminates in a flared portion 22. This flared portion 22 defines a cross section that is larger than a region of the base 12 forming an aperture 24. This feature allows for the second end 18 of the stanchion 14 to be slid through the aperture from underneath the base, while preventing the first end 16 of the stanchion from passing through the base. In an embodiment of the invention, the flared portion 22 of the stanchion nests within a countersunk region 32 defined by the underside of the base, for example a ring-shaped or an annular shaped depression. This provides a means for enhancing the surface area contact of the underside of the base with whatever surface supporting it.

In an embodiment of the invention, the aperture 24 of the base has a cross section sufficient to enable frictional engagement of the area of the stanchion which is proximal to and superior of the flared portion 22. The frictional engagement provides a means for preventing rotation of the stanchion while engaged with the base. In an embodiment (FIGS. 4A-C) of the invention, portions of the stanchion in close spatial relationship with a top side of the base define ridges 30 to frictionally engage with a medially directed surface defining the aperture 24 of the base.

FIG. 4A depicts a view of the stanchion 14 in its entirety, showing the ridges 30 in close proximity to the flared region 22. FIG. 4B is a detailed view of the first end 16 of the stanchion 14, also showing the ridges 30. FIG. 4C is a sectional view of the stanchion 14 taken along line 4C-4C as shown in FIG. 4B. FIG. 4C shows four ridges 30 on the exterior surface of the stanchion 14, but more or less ridges could be used.

In an embodiment of the invention as depicted in FIGS. 4A-C, medially extending protuberances 28 located in close spatial relationship to the flared region 22 provides means for preventing stack stanchions from nesting too deep into each other. As such, the regions prevent an overlying stanchion from sliding down too far onto an underlying stanchion. Otherwise, the loop of the underlying stanchion would jam into the interior cavity defining the underside of the second end 18 of the overlying stanchion, thereby preventing separation of the stanchions when they are being unstacked by personnel. FIGS. 4A-C depict the medially extending protuberances 28. FIG. 4C depicts a sectional view, demonstrating the relative distance that the protuberances 28 extend inwardly (i.e., toward the longitudinal axis of the stanchion). FIG. 4C depicts four protuberances 28, but more or less protuberances could be used. FIG. 4C also shows that the protuberances 28 and ridges 30 alternate, but that is not required for operation of the invention.

Figure 6B:
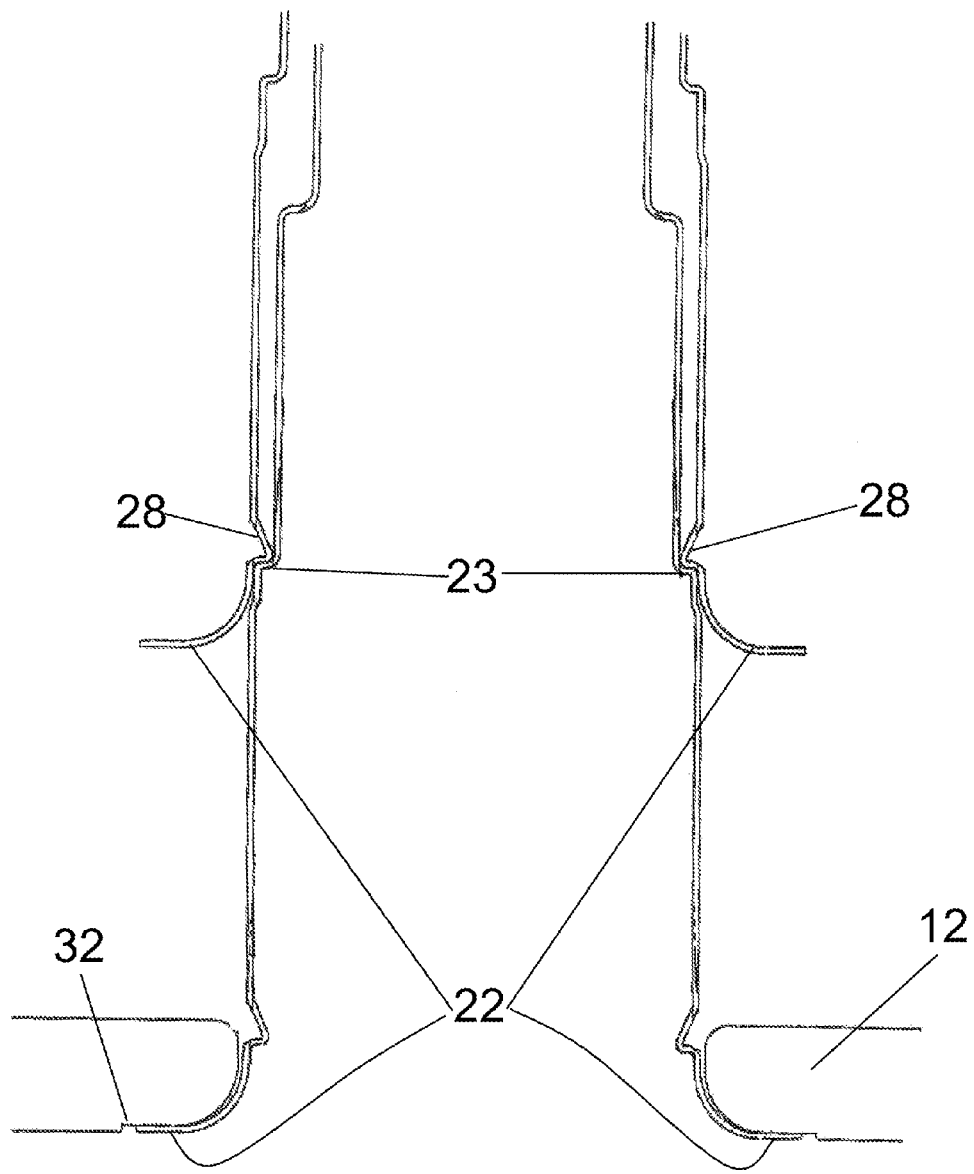
Figure 6C:
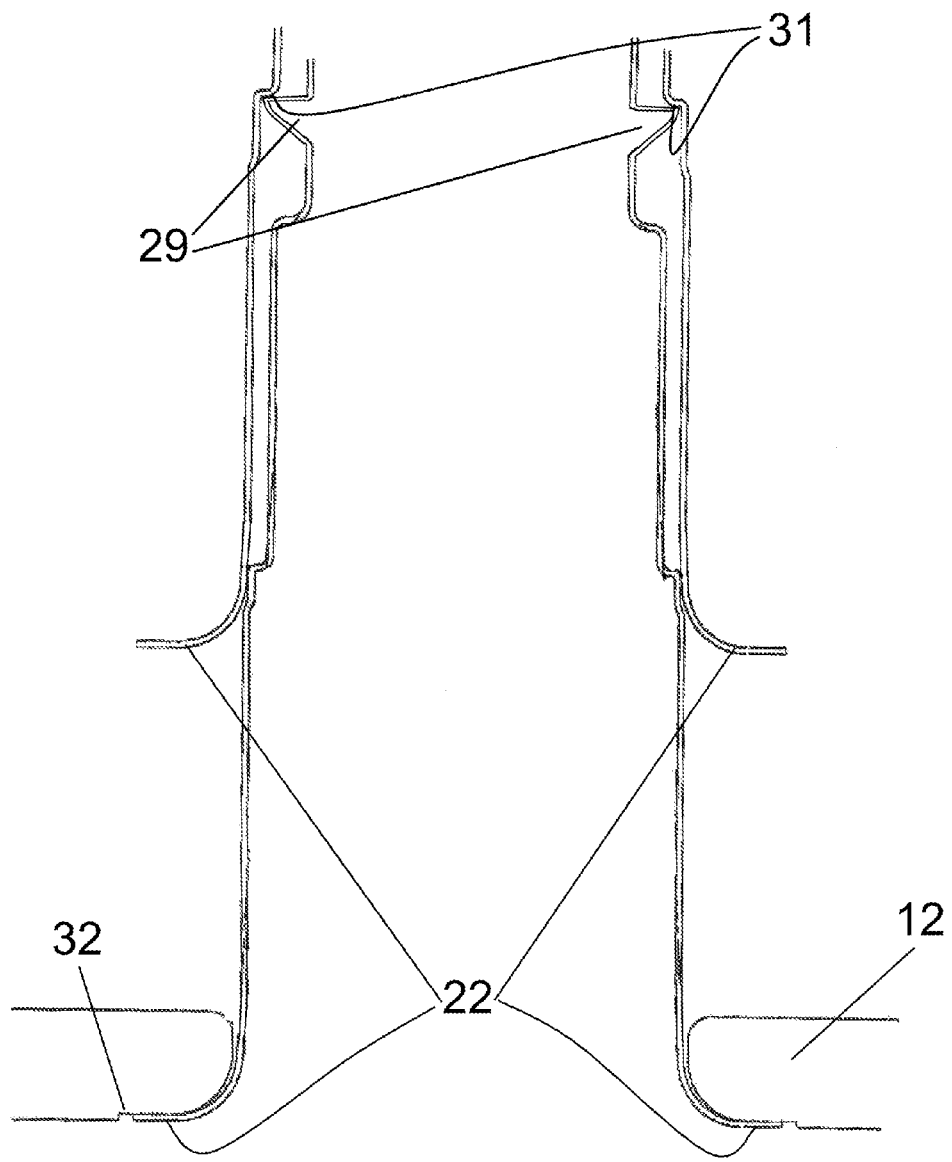

FIGS. 6A-B show how the protuberances 28 facilitate easy unstacking. FIG. 6A shows that the protuberances prevent contact between the interior surfaces of the outer stanchion and the exterior surface of the nested stanchion except where the protuberances 28 contact a generally horizontally disposed portion 23 on the first end 16 of the stanchion. FIG. 6B shows this feature in greater detail. As such, this embodiment of the invention enables stacking of stanchions whereby the stanchions contact each other only at their depending ends, thereby defining a continuous annular space between the stacked stanchions above the contact points.

In another embodiment of the invention, medially extending protuberances 28 are positioned along longitudinally extending regions of the stanchion. These protuberances would contact one or a plurality of generally horizontally disposed portions of exterior surfaces of underlying stanchions to prevent further sliding of the overlying stanchion over the underlying stanchion. Specifically, FIG. 6B shows how medially extending protuberances 28 from overlying stanchions contact horizontally disposed regions 23 of underlying stanchions defining steps so as to prevent tight stacking of the stanchions. This prevention is due to the non-friction fit interaction between stacked stanchions. Otherwise, rapid deployment of stanchions from the back of moving vehicles, or by fast moving personnel would be hindered. The generally horizontally disposed portions 23 could be defined as a single circumferential ring or a plurality of rings. A plurality of rings serving as a means for supporting an overlying stanchion would help distribute the weight of the overlying stanchion in the unlikely event that one of the rings collapsed or otherwise deformed.

Yet another embodiment is where laterally extending protuberances 29 from exterior surfaces of an underlying stanchion support medially extending surfaces 31 from interior surfaces of overlying stanchions. This configuration is shown in FIG. 6C.

Base Detail

The base 12 is adapted to be supported on a flat (but not necessarily horizontal surface), such as a roof, sidewalk, or railing. In addition, the underside or downwardly facing surface of the base can be configured to be complementary to the topography of an anticipating support surface, thereby enhancing the friction interaction between the downwardly facing surface of the base and that support surface.

FIGS. 5A-C depict an embodiment of the base 12. FIG. 5A depicts a plan view of the top of the base 12. As can be seen, the base is rectangular in shape; although other polygonal configurations can be utilized. The aperture 24 is located approximately at the center of the base 12. Optionally, the base also features handles 25, which facilitate handling or positioning, deployment, and storage of the base 12. In one embodiment, the base 12 features writing 27 to indicate to the user how to appropriately position the base 12 in relation to the roof edge. FIG. 5B depicts the underside of the base, featuring an annular shaped depression 32 adapted to receive a upwardly facing surface of the flared region of the stanchion. This depression enables the stanchion to be physically isolated from the support surface (roof) of the base.

FIG. 5C depicts a sectional view of the base taken along line 5C-5C as shown in FIG. 5B.

An embodiment of the base comprises enhancing the gripping ability of the downward facing surface of the base. One enhancement means is roughening up the surface so as to make it less slick. Another enhancement is applying a friction enhancing substrate to the depending or downwardly facing surface of the base, such substrate including adhering sand or other grit to the surface, or applying adhesive to the surface. Another embodiment of the base, used separately, or in conjunction with gripping enhancement is the provision of a reversibly deformable constituent in the base to allow for flexion of the base when a lateral force is applied the stanchion. This allows the base to "lean into" a force applied to the stanchion without toppling over. Suitable materials for the base would include Flexible PVC, Rubber, Urethane with a Shore "A" Durometer of approximately 50-80. Also crumb rubber such as recycled tire regrind held together with a urethane or similar binder is a suitable material.

In a preferred embodiment of the invention, the base is rectangular and in use, oriented such that the long axis is perpendicular to the roof edge. The extra length prevents tipping under load. Base shape is not important as long as the size and mass is large enough to resist the 16 pound tipping force required by OSHA regulations. The standard configuration for the OSHA test is shown in FIG. 3.

Square shaped bases, triangular shaped bases, circular-shaped bases, or bases made of wire frames are appropriate. Bases can be constructed to nest within roof valleys. Those valley-accommodating bases can further be reversed (by turning them upside down before sliding them over with the stanchions) to mate with roof ridges. As such, these bases, unlike the bases depicted in the figures, would define more than one plane. Alternatively, bases are envisioned which can be reversibly configured as flat surfaces, or nonflat surfaces.

As depicted in FIG. 1A, the stanchion is used as an anchor point for visual indicia 11, such as flags, placards, or lights. An example of use of the device is where a plurality of the modules are used in conjunction with each other and positioned along a periphery of a roof edge. Rope, light strings, or placards can be placed between adjacent stanchions and supported thereby. Alternatively, a first stanchion the apex of which is terminated by a laser transmitter can be situated adjacent to a second stanchion the apex of which terminates in a laser receiver to provide an audio and visual signal of periphery breach.

In operation, the stanchion/base module is designed to withstand tipping pressures applied to it in excess of 20 pounds. These results are more than 25 percent above the performance standards required per the aforementioned OSHA rule which requires the stanchion to sustain a load of at least 16 pounds. Specifically, and as depicted in FIG. 3, a cord C was tied to the stanchion 30 inches above the working/walking surface. The cord C was directed over a fulcrum F, and a load L was applied to the cord C. This produced a load in the direction perpendicular to the longitudinal axis $\alpha$ (depicted in FIG. 1B) of the stanchion. Load and rear lift off of the distal edge 26 of the base were recorded at load intervals of 15, 16, 17.5 and 20 pounds.

In an embodiment of the invention, the stanchion will bend or flex when under load. The base will also flex and bend resulting in the distal end 26 of the base (relative to the applied load) lifting off of the support surface. Bending is allowable since OSHA says it cannot tip over under 16 lbs of load. In fact, flexing and lifting of the base edge serves to dissipate the tipping load into the base and minimizes the deflection of the stanchion towards the horizontal. It also lessens the force tending to pull the stanchion upward out of the base.

The invented display device can be made of a myriad of materials including electrically isolative materials, radio-opaque, radio-translucent or radio-transparent materials, and corrosive resistant materials. For example, the stanchion can be molded from any type of plastic via blow, rotational, or injection molding. HDPE, LDPE, LLDPE, PVC, PP are all suitable materials.

The base can be formed from any high density material, Rubber, (virgin or recycled), Flexible PVC, etc. Furthermore, the base could also be generated via Blow/injection molding so as to be hollow and filled with a ballast material like sand or water. The base could possibly also be a flat panel which the device protrudes through which is then weighted with something like a sand bag.

In another embodiment of the invented device as shown in FIG. 7, the stanchion 14 features a laterally extending annular protrusion 40. The annular protrusion 40 facilitates efficient unstacking of the stanchions 14 similar to the laterally extending protrusions discussed supra. The annular protrusion 40 prevents the interior horizontally disposed regions 30 of an outer stacked device from passing below a certain point on the nested stanchion. In this way, the interior surfaces of the outer stanchion are prevented from contacting the exterior surfaces of the nested stanchion.

Closed Bottom Embodiments

It is to be understood that the above description is intended to be illustrative, and not restrictive. For example, the above-described embodiments (and/or aspects thereof) may be used in combination with each other, or in combination with stanchions that do not stack. Such unstackable stanchions would not feature an opening 31 of the type disclosed supra. Alternatively, the opening 31 can be fitted with a plug 42 so as to prevent stanchion stacking.

An embodiment utilizing a plug 42 is shown in FIGS. 8A-E. FIG. 8A depicts one entire stanchion 14 with a plug 42. FIG. 8B shows a detail view of the embodiment shown in FIG. 8A. FIG. 8C is a depiction of the stanchion 14 shown from the perspective of line 8C-8C as shown in FIG. 8A, which shows the opening 31 in the stanchion 14 that receives the plug 42. FIGS. 8D and 8E provide additional views of the plug 42. As can be seen in FIG. 8E, the plug 42 features a first tier 44 that contacts the ground or working surface and a second raised tier 46. Extending laterally from the second tier 46 are locking tabs 48. The locking tabs 48 are designed to be received by similarly sized and shaped slots 50. The slots 50 are best seen in FIGS. 8B and 8C. Upon matching the locking tabs 48 to the slots 50, the plug 42 is inserted into opening 31. The first tier 44 will contact a lip 52 that circumscribes the opening 31 when the plug is fully inserted into the opening 31. The user then twists the plug 42 either clockwise or counterclockwise within a channel 54 defined by the lip 52 and the horizontally disposed region 23 of the opening 31. As can be seen in FIG. 8D, a small gap 56 is provided between the first tier 44 and the locking tab 48 such that rotation of the plug 42 will not be blocked by the lip 52. Rotation of the plug 42 will secure it to the opening 31. Removal of the plug 42 is accomplished by rotation of the plug 42 to a position in which the locking tabs 48 realign with slots 50.

The plug 42 may optionally be weighted so as to confer ballast or center anchoring if need be. The ballast provides additional stability to the unit when used in conjunction with either a weighted or un-weighted base 12. Ballasting can also be achieved by filling the stanchion 14 with a material, such as sand or pebbles, and then sealing the stanchion 14 with the plug 42. A plug 42 would also provide a means for preventing tar, cement and other detritus from entering the interior cavity of the stanchion. Further, the plug 42 would confer buoyancy to the stanchion by trapping air within the confines of the stanchion. This buoyancy would prove useful in the event that the stanchions are submerged in water during a flood.

The advantage of "twist lock" unit described above is that the stanchions can be stacked when the plug is not inserted for compact storage. However, the aforementioned advantages, such as blocking debris, ballasting the stanchion, and providing buoyancy, can still be achieved when the plug is inserted and locked into place.

Figure 9:
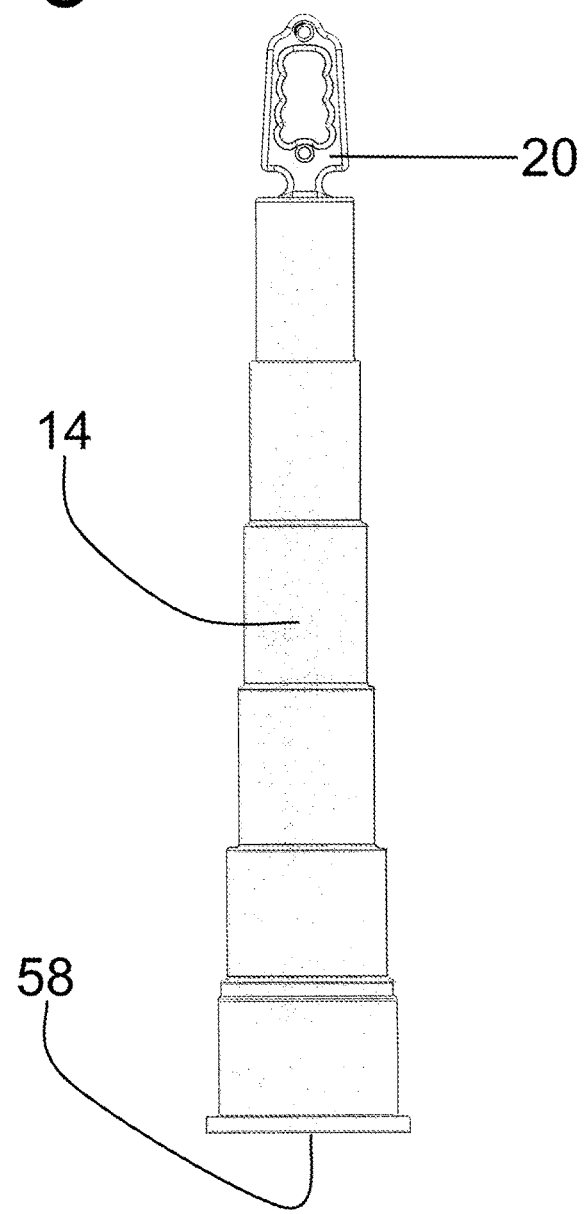
FIG. 9 is a schematic view of a stanchion with closed depending end, in accordance with features of the present invention.

FIG. 9 shows an embodiment that is not stackable due to a closed bottom 58 at the lower end of the unit. This creates a hollow part which would have the advantage of buoyancy. This would be used with the same type of bases described above for the other embodiments.

Figures 10A, 10B:
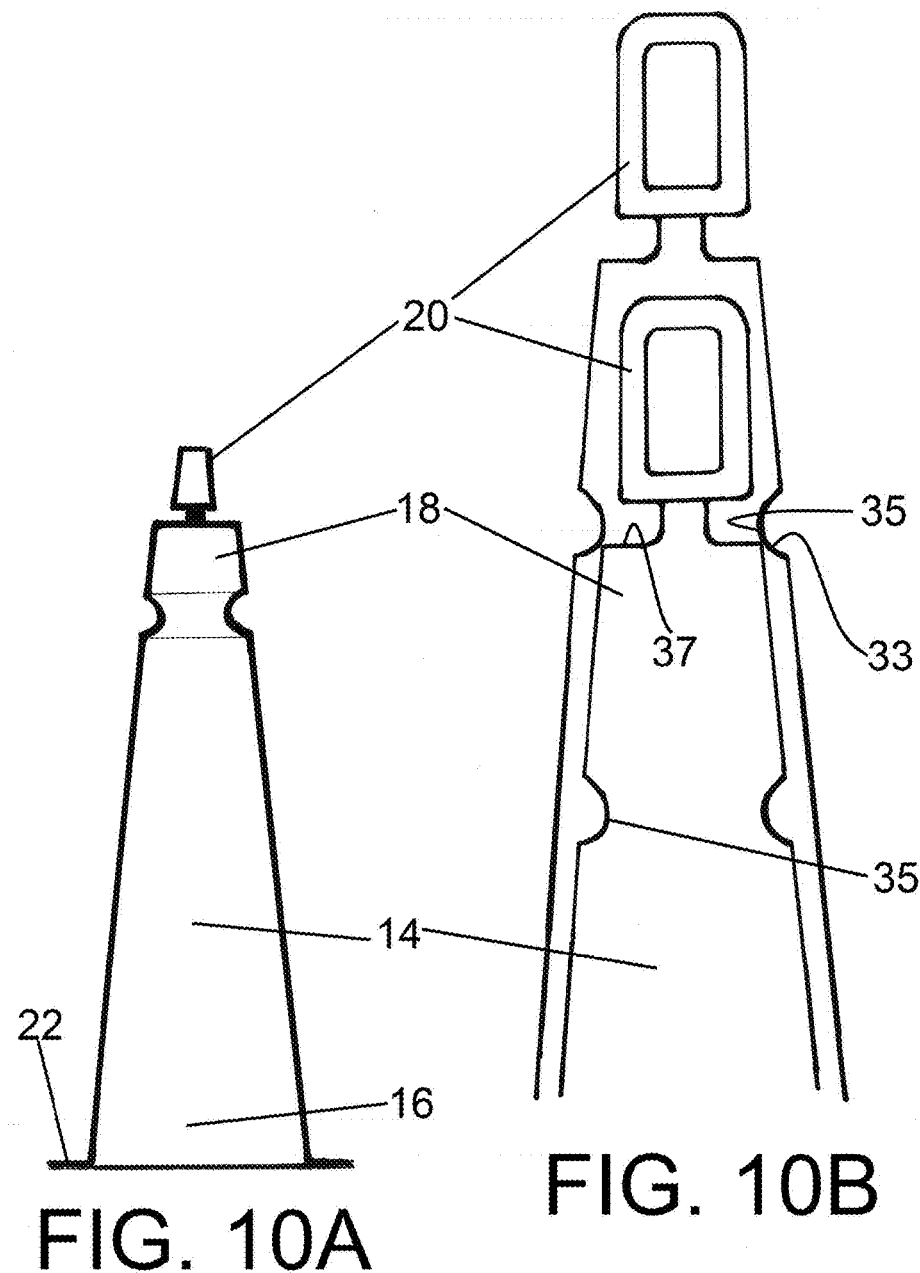
FIGS. 10A-B depict still another alternate embodiment with a tapered stanchion, in accordance with features of the present invention.

FIG. 10A depicts a stanchion that is generally tapered from a smaller diameter at the second end 18 where the warning line can be attached to a larger diameter at the first end 16. The major features of the stanchion would remain the same as in previous embodiments, e.g., the flared portion 22 at the bottom, ridges 30 to hold the unit into base, and a loop 20 for attachment of a light or for handling of the unit. However, the design depicted in FIG. 10A is frustoconical as opposed to the tiered shape of the embodiment of FIG. 1B. Another distinction from the prior embodiments is the stacking protuberance. In the embodiment of FIG. 10, the protuberance for stacking is an annular depression 33 or ring located near the second end 18 of the tapered section.

As can be seen in FIG. 10B, a medially projecting surface 35 defined by the opposite side of the annular depression 33 would contact a laterally projecting region 37 of an underlying stanchion to prevent the overlying stanchion from nesting too tightly with the underlying stanchion. A salient feature of the embodiment displayed in FIGS. 10A-B is that but for the annular depression and the medially projecting surface near a superior end of the stanchion, the longitudinally extending surfaces of these stanchions are smooth, and sans any steps or other artifacts.

In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A device for displaying hazard indicia, said device comprising:
    at least one frustoconical stanchion with a first depending end and a second end, an interior surface, and exterior surface, wherein the surface of the stanchion tapers from a relatively larger cross section at the first end to a relatively smaller section at the second end, wherein the second end defines a horizontally disposed region;
    a base configured to engage the first end of the at least one frustoconical stanchion;
    an annular protuberance in the interior surface of the at least one stanchion, wherein the annular protuberance is intermediate the first and second ends and disposed proximate to the second end of the at least one frustoconical stanchion;
    wherein said annular protuberance is configured to contact a matching stanchion coaxially received by the at least one stanchion such that only the annular protuberance of the at least one stanchion contacts the horizontally disposed region of the matching stanchion so as to create a void between the stacked stanchions aside from the single plane of contact between the annular protuberance of the at least one stanchion and the horizontally disposed region of the matching stanchion.

2. A system for demarcating a safe distance from a hazard, said system comprising:
    a plurality of devices for displaying hazard indicia, each device being placed in a manner so as to define a safe distance from a hazard, wherein each device comprises:
        at least one stanchion defining an interior surface and exterior surface, a first end and a second end, whereby the first end defines a first cross section that is larger than a second cross section of the second end, wherein the at least one stanchion further comprises an annular protuberance in the interior surface of the at least one stanchion, and wherein a portion of the exterior surface of the at least one stanchion defines a horizontally disposed region, and wherein the annular protuberance of the at least one stanchion creates a single plane of contact with the horizontally disposed region of a matching stanchion when the matching stanchion is received by the at least one stanchion; wherein the means for creating a single plane of contact also create a void between the exterior surface of the matching stanchion and the interior surface of the at least one stanchion aside from the single plane of contact;

a base adapted to removably receive the first end of the at least one stanchion so as to maintain the stanchion in a vertical position; and a material strung between each device, wherein the material is attached to each device at a height above a work surface and wherein the material does not sag below 30 inches above the work surface at any point.

3. The system of claim 2, wherein the hazard is a roof edge.

4. The system of claim 2, wherein the material is a length of cord with a plurality of flags depending from the cord.

5. A stackable device for displaying hazard indicia, the device comprising:

at least one frustoconical stanchion with a first depending end and a second end, an interior surface, and exterior surface, wherein the surface of the stanchion tapers from a relatively larger cross section at the first end to a relatively smaller section at the second end, and wherein the at least one stanchion defines a horizontally disposed portion proximate to the first end of the at least one stanchion;

a base configured to engage the first end of the at least one frustoconical stanchion;

an annular protuberance in the interior surface of the at least one stanchion, wherein the annular protuberance is intermediate the first end and horizontally disposed portion;

wherein said annular protuberance is configured to contact a matching stanchion coaxially received by the at least one stanchion such that only the annular protuberance of the at least one stanchion contacts the horizontally disposed region of the matching stanchion so as to create a void between the stacked stanchions aside from the single plane of contact between the annular protuberance of the at least one stanchion and the horizontally disposed region of the matching stanchion.

6. The device as recited in claim 5, further comprising a tie point, wherein the tie point is between 38 and 40 inches from a working surface upon which the stanchion stands.

7. The device as recited in claim 5, wherein the first end of the at least one stanchion has at least one ridge that frictionally engages with the base.

8. The device as recited in claim 5, wherein the first end of the at least one stanchion terminates in a laterally extending flange and said flange is received within an annular groove of the base.

9. The device as recited in claim 5, wherein the base is adapted to receive ballast material.

10. The device of claim 5, wherein an opening is provided on a bottom of the first end of the at least one stanchion.

11. The device of claim 10, further comprising a plug adapted to be received in the opening.

12. The device of claim 11, wherein the opening has a number of slots adapted to receive a number of locking tabs on the plug.

13. The device of claim 12, wherein the plug is locked into the opening upon rotation of the plug within the opening and wherein the opening is substantially sealed when the plug is in the locked position.

14. The device of claim 11, wherein the plug is weighted to ballast the at least one stanchion.

* * * * *